July 20, 1937. C. V. GARDNER 2,087,509
PRESSURE PRODUCING MEANS FOR HYDRAULIC PRESSURE SYSTEMS
Filed Nov. 29, 1935
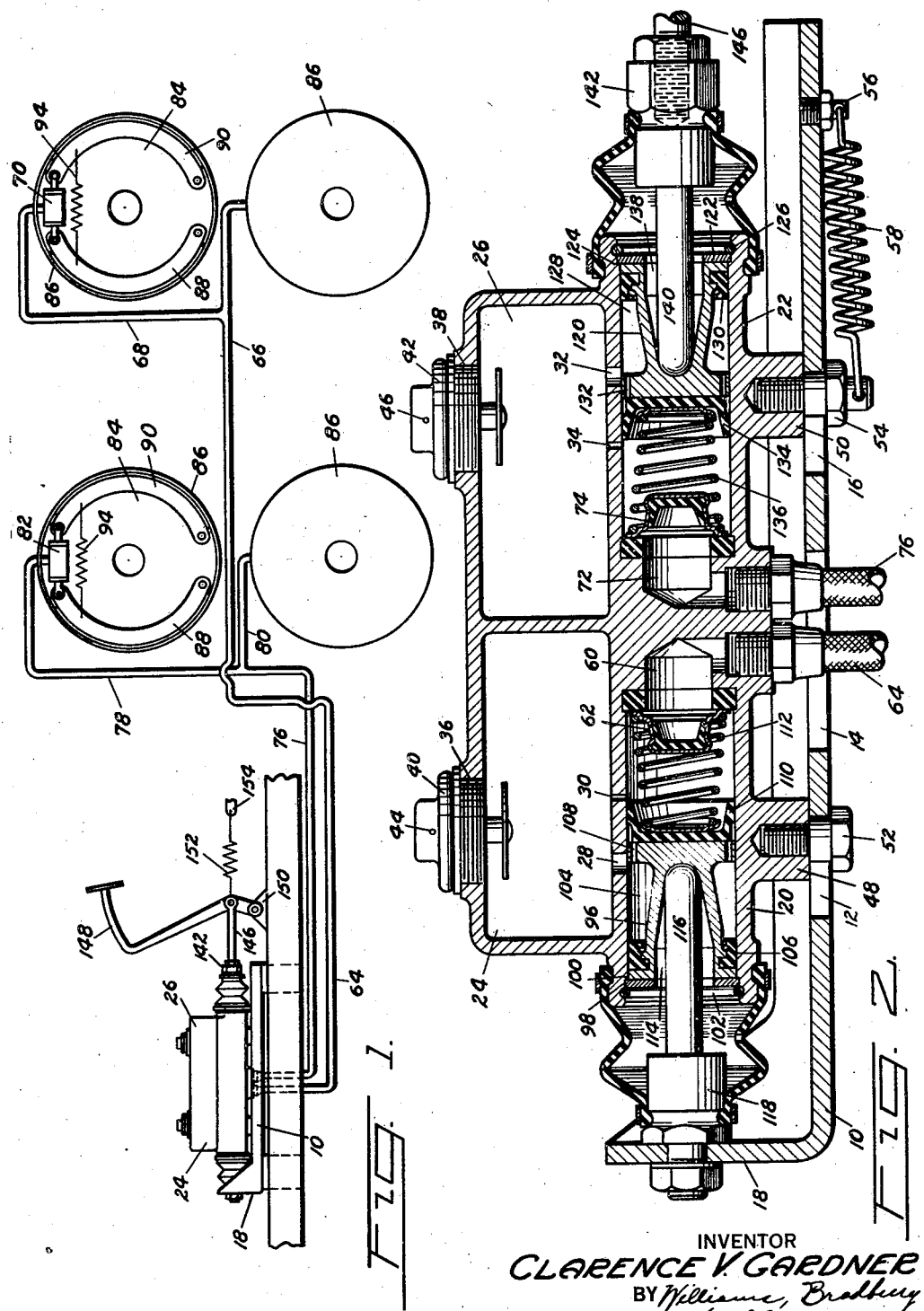
INVENTOR
CLARENCE V. GARDNER
BY
ATTORNEYS.

Patented July 20, 1937

2,087,509

UNITED STATES PATENT OFFICE 2,087,509

PRESSURE PRODUCING MEANS FOR HYDRAULIC PRESSURE SYSTEMS

Clarence V. Gardner, Detroit, Mich., assignor to Hydraulic Brake Company, Detroit, Mich., a corporation of California Application November 29, 1935, Serial No. 52,000

6 Claims. (Cl. 60—54.5)

This invention relates to fluid pressure systems for motor vehicle brakes and more particularly to dual braking systems, one for applying the brakes associated with the front wheels of the vehicle, and the other for applying the brakes associated with the rear wheels of the vehicle.

An object of the invention is to provide a duel braking system for operating two sets of brakes.

Another object of the invention is to provide a dual braking system for operating two sets of brakes with equalization between the systems.

Another object of the invention is to provide a dual braking system for operating the brakes associated with the wheels of a motor vehicle and to so construct and arrange the separate systems that they may be operated by a single operating means.

A further object of the invention is to provide a duel braking system for operating the brakes associated with the wheels of a motor vehicle and to so construct and arrange the same that in normal operation the systems are equalized, and in the event of the failure of one of the systems, due to breakage or leakage, the remaining system may be effectively operated.

Other objects and advantages of the invention will appear from the following description taken in connection with the drawing forming a part of this specification, and in which,—

Fig. 1 is a schematic view of a hydraulic brake system embodying the invention; and Fig. 2 is a vertical, sectional view of the master operating unit.

Referring to the drawing for more specific details of the invention, 10 represents a fixed support which may be a part of the motor vehicle chassis frame or a support suitably secured to the frame. Preferably the support is finished on its upper side to provide a smooth polished surface, the purpose of which will hereinafter appear. The body of the support is provided with a plurality of spaced longitudinal slots 12, 14 and 16, and one end of the support is bent upwardly normal to its body portion as at 18.

Slidably mounted on the polished surface of the support 10 is a casting comprising opposed cylinders 20 and 22 with reservoirs 24 and 26 superimposed on the cylinders. The cylinder 20 communicates with the reservoir 24 by way of ports 28 and 30, and the cylinder 22 communicates with the reservoir 26 by way of ports 32 and 34. The reservoirs have conventional filling openings 36 and 38 closed by suitable plugs 40 and 42, and are vented as indicated at 44 and 46.

As shown, the cylinder 20 has a dependent boss 48 and the cylinder 22 has a dependent boss 50. These bosses have highly polished flat surfaces of sufficient diameter to straddle the slots 12 and 16, respectively, and slidably engage the polished surface of the support 10. Threaded into the bosses from the back of the support 10 are retaining bolts 52 and 54. These bolts also serve to guide the movements of the cylinders and reservoirs, and connected between one of the bolts and the fixed support 56 is a retractor spring 58.

The cylinder 20 has a discharge port 60 controlled by a two-way valve 62, and connected to the discharge port is a fluid pressure delivery pipe 64 having branches 66 and 68 connected respectively to fluid pressure actuated motors 70 arranged for the actuation of brakes associated with the front wheels of a motor vehicle; and the cylinder 22 has a discharge port 72 controlled by a two-way valve 74, and connected to the discharge port 72 is a fluid pressure delivery pipe 76 having branches 78 and 80 connected respectively to fluid pressure actuated motors 82 arranged for the actuation of brakes associated with the rear wheels of the vehicle.

Each of the brake structures includes a fixed support or backing plate 84, a rotatable drum 86 associated therewith, corresponding friction elements or shoes 88 and 90 pivoted on the backing plate, and a fluid pressure motor corresponding to the fluid pressure motors 70 or 82 suitably connected to the separable ends of the friction elements or shoes for spreading the shoes into engagement with the drum 86 against the resistance of a retractile spring 94.

A piston 96 reciprocable in the cylinder 20 is retained against displacement by a washer 98 held against a shoulder 100 in the open end of the cylinder 20 by a split ring 102 seated in a circumferential groove. This piston has a reduced body portion providing in conjunction with the wall of the cylinder 20 an annular chamber 104 communicating with the reservoir 24 by way of port 28. The skirt of the piston has thereon a leakproof washer 106 which prevents seepage of fluid from the cylinder past the piston, and the head of the piston has a plurality of ports 108 providing communications between the annular chamber 104 and that portion of the cylinder forward of the piston.

A collapsible leak-proof cup 110 on the head of the piston controls the ports 108. This cup is held against displacement by a spring 112 interposed between the cup and the two-way valve 62. The spring 112 also serves to assist in the return of the piston to its retracted position.

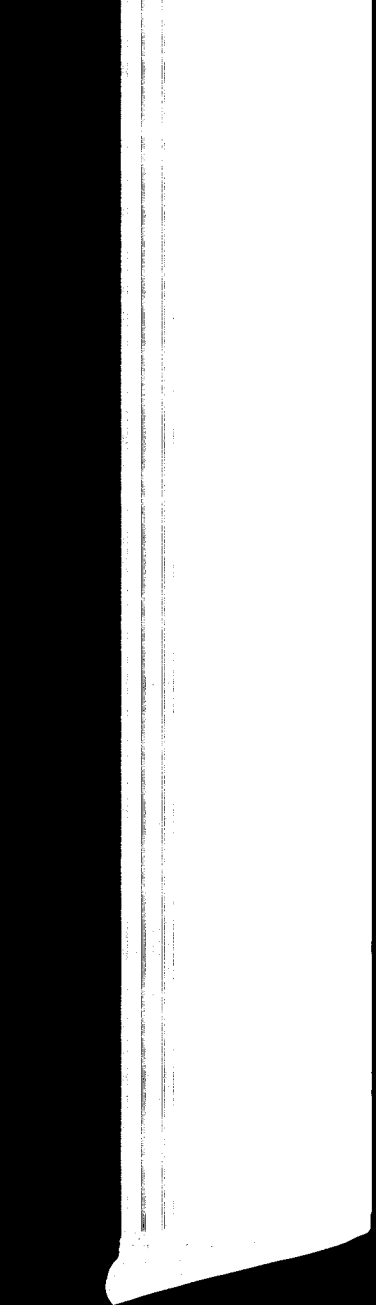

ports, pistons in the cylinders, means supporting the cylinders for reciprocation, fluid pressure actuated motors connected to the discharge port of each cylinder, means retaining one of the pistons against movement, and means for actuating the other piston.

5. A fluid braking system comprising a duplex pressure producing device including a single casting, cylinders therein arranged head to head, a member supporting the casting for longitudinal reciprocation, fluid pressure actuated motors connected to the respective cylinders, pistons in the cylinders, a fixed member retaining one of the pistons against movement, and a movable member for actuating the other piston.

6. A fluid pressure system comprising a duplex fluid pressure producing device including a pair of cylinders arranged head to head, a separate reservoir for supplying fluid to each cylinder, a piston in each of the cylinders, a bracket supporting the cylinders for reciprocation, fluid pressure actuated motors connected to each cylinder, means on the bracket resisting movement of one of the pistons, and means for actuating the other piston.

CLARENCE V. GARDNER.